US012787098B2

(12) United States Patent
Yue et al.

(10) Patent No.: US 12,787,098 B2
(45) Date of Patent: Nov. 3, 2026

(54) METHOD AND APPARATUS FOR DATA TRANSMISSION

(71) Applicant: Lenovo (Beijing) Limited, Beijing (CN)

(72) Inventors: Ran Yue, Beijing (CN); Jie Shi, Beijing (CN); Jing Han, Beijing (CN); Lianhai Wu, Beijing (CN); Mingzeng Dai, Shanghai (CN)

(73) Assignee: Lenovo (Beijing) Limited, Beijing (CN)

(*) Notice: Subject to any disclaimer, the term of this patent is extended or adjusted under 35 U.S.C. 154(b) by 300 days.

(21) Appl. No.: 18/261,328

(22) PCT Filed: Jan. 14, 2021

(86) PCT No.: PCT/CN2021/071908

§ 371 (c)(1),
(2) Date: Jul. 13, 2023

(87) PCT Pub. No.: WO2022/151254

PCT Pub. Date: Jul. 21, 2022

(65) Prior Publication Data

US 2024/0080928 A1 Mar. 7, 2024

(51) Int. Cl.

*H04W 76/20* (2018.01)
*H04W 28/02* (2009.01)

(Continued)

(52) U.S. Cl.

CPC ....... *H04W 76/20* (2018.02); *H04W 28/0278* (2013.01); *H04W 72/1268* (2013.01);

(Continued)

(58) Field of Classification Search

None

See application file for complete search history.

(56) References Cited

U.S. PATENT DOCUMENTS

2018/0324642 A1 11/2018 Yu et al.
2018/0376332 A1 12/2018 Mallick (Continued)

FOREIGN PATENT DOCUMENTS

CN 108696934 A 10/2018
CN 109803331 A 5/2019
CN 110574487 A 12/2019

OTHER PUBLICATIONS 21918462.9 , "Extended European Search Report", EP Application No. 21918462.9, Sep. 10, 2024, 14 pages.

(Continued)

*Primary Examiner* — Christine T Duong
*Assistant Examiner* — Christine D Fuqua
(74) *Attorney, Agent, or Firm* — FIG. 1 Patents

(57) ABSTRACT

Embodiments of the present application are related to a method and apparatus for data transmission. An exemplary method of the present application includes: generating a first physical data unit (PDU) based on first key information from a wireless network while a terminal device is in a non-connected state with the wireless network; receiving a second key information from the wireless network; generating a second PDU from the generated first PDU based on the second key information; and transmitting the generated second PDU within the wireless network.

20 Claims, 3 Drawing Sheets

(51) Int. Cl.
*H04W 72/1268* (2023.01)
*H04W 76/19* (2018.01)
*H04W 74/0833* (2024.01)
*H04W 74/0836* (2024.01)

(52) U.S. Cl.
CPC ........ *H04W 76/19* (2018.02); *H04W 74/0833* (2013.01); *H04W 74/0836* (2024.01)

(56) References Cited

U.S. PATENT DOCUMENTS

| | | | | |
|---|---|---|---|---|
| 2019/0261177 | A1 | 8/2019 | Ali et al. | |
| 2020/0137761 | A1 | 4/2020 | Shih et al. | |
| 2021/0211947 | A1* | 7/2021 | Agiwal | H04W 72/23 |
| 2023/0379905 | A1* | 11/2023 | Feltrin | H04W 72/21 |
| 2023/0389117 | A1* | 11/2023 | Laselva | H04W 74/08 |

OTHER PUBLICATIONS

Samsung , "Control Plane Aspects of SDT", 3GPP TSG-RAN2 Meeting #112 Electronic, R2-2009095, Nov. 2020, 4 pages.
Spreadtrum Communications , "Discussion on the general aspects for small data transmission", 3GPP TSG-RAN WG2 Meeting #112 electronic, R2-2009151, Online, Nov. 2020, 2 pages.
VIVO , "General Considerations on Small Data Transmission", 3GPP TSG-RAN WG2 Meeting#111-electronic, R2-2006550, E-Meeting, Aug. 2020, 6 pages.
ZTE Corporation , "Agreeable details of RRC-based solution for SDT (RACH and CG)", 3GPP TSG-RAN2 Meeting #112-e, R2-2009189, e-Meeting, Nov. 2020, 57 pages.
PCT/CN2021/071908 , "International Preliminary Report on Patentability", PCT Application No. PCT/CN2021/071908, Jul. 27, 2023, 5 pages.
PCT/CN2021/071908 , "International Search Report and Written Opinion", PCT Application No. PCT/CN2021/071908, Sep. 28, 2021, 6 pages.
ZTE , "Consideration on context maintenance", 3GPP TSG-RAN WG2 #97, R2-1701928, Athens, Greece [retrieved Aug. 8, 2023]. Retrieved from the Internet <https://www.3gpp.org/ftp/tsg_ran/wg2_r12/TSGR2_97/Docs/>., Feb. 2017, 6 Pages.
Foreign Office Action issued in CN 202180090290.1, mailed Jul. 28, 2026, 16 pages.

* cited by examiner

METHOD AND APPARATUS FOR DATA TRANSMISSION

TECHNICAL FIELD

Embodiments of the present application generally relate to wireless communication technology, especially to a method and apparatus for data transmission, e.g., data transmission associated with a terminal device, e.g., a user equipment (UE) in a non-connected state.

BACKGROUND

In 3GPP (3rd generation partnership project) 5G system, small data transmission (SDT) is introduced for several application scenarios. For example, according to an agreement of 3GPP TSG RAN Meeting #86, a small data transmission can be used for smartphone applications including traffic from instant messaging services or used for non-smartphone applications including traffic from wearables. A small data transmission may also be named as a small data packet or the like. Generally, any device that has intermittent small data transmissions in a non-connected state, e.g., a radio resource control (RRC) inactive state or a RRC idle state will benefit from enabling small data transmission in the non-connected state.

According to R2-2009189, to include a buffer status report (BSR) for non-SDT data radio bearer (DRB)(s) during a SDT procedure, the non-SDT DRB(s) should also be resumed. However, several issues on the data transmission associated with a terminal device, e.g., UE in a non-connected state have not been discussed yet. For example, how to handle the resumed non-SDT DRB(s) during the SDT procedure, especially, how to handle the resumed non-SDT DRB(s) during the SDT procedure due to key information change and how to indicate the new key information being enabled to the network side etc. Thus, the industry need to solve all these issues on the data transmission associated with a terminal device in non-connected state.

SUMMARY OF THE APPLICATION

One objective of the embodiments of the present application is to provide a technical solution for data transmission, e.g., data transmission for non-SDT DRB(s) resumed for the UE in the non-connected state etc.

According to some embodiments of the present application, a method includes: generating a first physical data unit (PDU) based on first key information from a wireless network while a terminal device is in a non-connected state with the wireless network; receiving a second key information from the wireless network; generating a second PDU from the generated first PDU based on the second key information; and transmitting the generated second PDU within the wireless network.

In some embodiments of the present application, generating a second PDU from the generated first PDU is applied to at least one DRB in response to configuration information received from a network side or predefined in a specification.

In some embodiments of the present application, generating a second PDU from the generated first PDU begins from a PDCP service data unit (SDU) first being submitted to the layer lower than the PDCP layer. In some other embodiments of the present application, generating a second PDU from the generated first PDU is applied to PDCP SDU (s) whose corresponding radio link control (RLC) SDU or RLC SDU segment has not been delivered to a media access control (MAC) layer in the case the non-connected state being transferred to a connected state. In some yet other embodiments of the present application, generating a second PDU from the generated first PDU is performed in response to the UE receiving the second key information. In some yet other embodiments of the present application, generating a second PDU from the generated first PDU is performed in the case that a layer higher than the PDCP layer requests a PDCP entity re-establishment. In some yet other embodiments of the present application, generating a second PDU from the generated first PDU is applied to PDCP SDU(s) which has been submitted to the layer lower than the PDCP layer. In some yet other embodiments of the present application, generating a second PDU from the generated first PDU is applied to PDCP SDU(s), for which included in MAC PDU(s) or for whose corresponding RLC SDU(s) or RLC SDU segment included in the MAC PDU(s), successful delivery(s) has not been confirmed in the case the non-connected state being transferred to a connected state. In some yet other embodiments of the present application, the above generating a second PDU from the generated first PDU solution is applied to at least one configured or pre-defined data radio bearer (DRB).

In some other embodiments of the present application, generating a second PDU from the generated first PDU is applied up to user equipment (UE) implementation.

According to some embodiments of the present application, generating a second PDU from the generated first PDU is for unacknowledged mode (UM) non-SDT data radio bearer DRB.

According to some embodiments of the present application, transmitting the generated second PDU within the wireless network may include: submitting the generated second PDU to a layer lower than a PDCP layer.

According to some embodiments of the present application, in the case that the non-connected state is transferred to a connected state, or the terminal device receives the second key information, or a layer higher than the PDCP layer requests a PDCP entity re-establishment, the method further includes: not re-establishing a PDCP entity for at least one of non-SDT DRB and SDT DRB; or not discarding PDCP SDU(s) corresponding to first PDCP PDU(s) generated with the first key information. The method may further include: indicating the layer lower than the PDCP layer to discard RLC SDU associated with the first PDCP PDU and corresponding at least one RLC PDU in some embodiments of the present application. In some other embodiments of the present application, the method may further include: regarding a PDCP SDU associated with the first PDCP PDU as that received from a layer higher than the PDCP layer for UM DRB.

According to some embodiments of the present application, the method may further include: suspending ciphering and integrity protection for DRB which is not configured to be transmitted in the case of the terminal device is in non-connected state according to configuration information received from a network side or predefined in a specification in the case of the UE being in the non-connected state. The method may further include: resuming the ciphering and integrity protection for the DRB, which includes: performing the ciphering and integrity protection with the second key information for PDCP PDU(s) whose ciphering and integrity protection is suspended.

According to some embodiments of the present application, the method may include: in response to the UE not be resumed to a connected state, partially resuming the non-SDT DRB.

According to some embodiments of the present application, the method may include: transmitting an indication to indicate the second key information is enabled or the first key information is disabled. The indication may be included in a PDCP PDU first being generated with the second key information. The indication is one bit or a message.

According to some embodiments of the present application, the method may include: in response to at least one BSR trigger condition being satisfied, reporting a buffer state of a logical channel associated with arrived non-SDT data in the case of the terminal device being in the non-connected state. One of the at least one BSR trigger condition is whether a time point to an expiry of non-SDU discardTimer is larger than a threshold. In some embodiments of the present application, reporting the buffer state is based on configuration information allowing to report the buffer state of non-SDT data, wherein whether to allow to report the buffer state of non-SDT data or not is configured per RLC mode.

Some embodiments of the present application also provide an apparatus, including: at least one non-transitory computer-readable medium having computer executable instructions stored therein, at least one receiving circuitry; at least one transmitting circuitry; and at least one processor coupled to the at least one non-transitory computer-readable medium, the at least one receiving circuitry and the at least one transmitting circuitry. The computer executable instructions are programmed to implement any method as stated above with the at least one receiving circuitry, the at least one transmitting circuitry and the at least one processor.

Embodiments of the present application provide a method and apparatus for data transmission, which can solve issues caused by key information change for a terminal device in the non-connected state and thus can facilitate and improve the implementation of new radio (NR).

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed descriptions of the appended drawings are intended as descriptions of preferred embodiments of the present application and are not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP long term evolution (LTE), and so on. It is contemplated that along with the developments of network architectures and new service scenarios, all embodiments in the present application are also applicable to similar technical problems. Moreover, the terminologies recited in the present application may change, which should not affect the principle of the present application.

Figure 1:
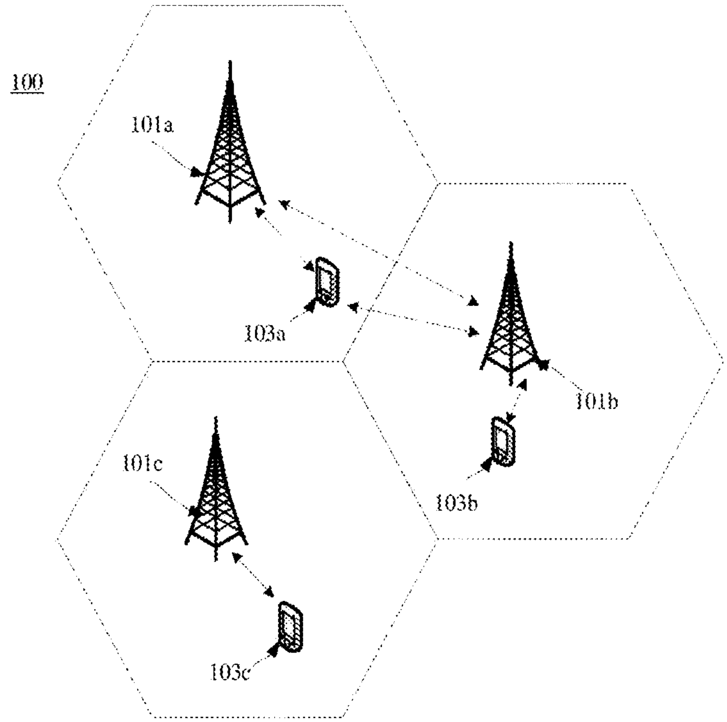
FIG. 1 illustrates a wireless communication system according to some embodiments of the present application.

FIG. 1 illustrates a schematic diagram of an exemplary wireless communication system 100 according to some embodiments of the present application.

As shown in FIG. 1, the wireless communication system 100 includes a plurality of BSs, e.g., the BS 101*a*, BS 101*b* and BS 101*c* and a plurality of terminal devices, e.g., the UE 103*a*, UE 103*b* and UE 103*c*. Although a specific number of BSs and terminal devices are illustrated in FIG. 1 for simplicity, it is contemplated that the wireless communication system 100 may include more or less BSs and terminal devices in some other embodiments of the present application.

The wireless communication system 100 is compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

The BS, e.g., the BS 101*a*, BS 101*b* and BS 101*c* may communicate with a core network (CN) node (not shown), e.g., a mobility management entity (MME) or a serving gateway (S-GW), a mobility management function (AMF) or a user plane function (UPF) etc. via an interface. A BS also be referred to as an access point, an access terminal, a base, a macro cell, a node-B, an enhanced node B (eNB), a gNB, a home node-B, a relay node, or a device, or described using other terminology used in the art. In 5G NR, a BS may also refer to as a radio access network (RAN) node. Each BS may serve a number of UE(s) within a serving area, for example, a cell or a cell sector via a wireless communication link. Neighbor BS s may communicate with each other as necessary, e.g., during a handover procedure for a UE.

The terminal device, e.g., the UE 103*a*, UE 103*b* and UE 103*c* may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present application, the terminal device may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the terminal device may include wearable devices, such as smart watches, fitness bands, optical head-mounted displays, or the like. Moreover, the terminal device may be referred to as a subscriber unit, a mobile, a mobile station, a user, a terminal, a mobile terminal, a wireless terminal, a fixed terminal, a subscriber station, a user terminal, or a device, or described using other terminology used in the art. Herein (through the specification), as a classical terminal device, "UE" is used exemplarily for illustrating the terminal device.

In LTE, in the case that a terminal device, e.g., a UE wants to transmit data, it may trigger an early data transmission (EDT) procedure. The EDT procedure may include an EDT procedure for control plane (CP) cellular internet of things (CIoT) evolved packet system (EPS) optimizations and an EDT procedure for user plane (UP) CIoT EPS optimizations. In the EDT procedure for CP CIoT EPS optimizations, the data may be transmitted through a RRC early data request message. In the EDT procedure for UP CIoT EPS optimization, the data may be transmitted through an RRC connection resume request message.

The EDT procedure evolves into a SDT procedure in NR. For example, during a SDT procedure, in the case that a UE wants to transmit data in RRC_INACTIVE state or RRC_IDLE state, the data may be transmitted through a random access channel (RACH)-based scheme, e.g., 2-step RACH scheme or 4-step RACH scheme via pre-configured physical uplink share channel (PUSCH) resources.

Currently, a BSR on SDT will be transmitted to the network side to let the network side allocate the uplink grant for the data transmission of the UE in the non-connected. According to R2-2009189, non-SDT DRBs should also be resumed to include the BSR for the non-SDT DRBs during the SDT procedure. When the BSR including the buffer state of non-SDT is enabled, data PDUs of non-SDT DRBs may be generated as the PDCP PDU with the key information derived from a current cell, e.g., the first cell and submitted to the RLC layer. The network side may resume the RRC connection to transmit the non-SDT data. However, in the case that a UE, e.g., the UE 103*a* moves from the first cell into the second cell, the key information derived from the first cell (old key information) may be updated to be the key information derived from the second cell (new key information). According to the legacy rules for the UE in RRC_CONNECTED state, the PDCP entity re-establishment for the non-SDT DRBs may be performed.

However, for some DRBs, e.g., unacknowledged mode (UM) DRBs, only PDCP SDU(s) which has already been associated with a PDCP sequence number (SN) but whose corresponding PDCP PDU has not been submitted to lower layers, e.g., a RLC layer will be considered as being received from upper layers, e.g., a service data adaption protocol (SDAP). Then, the PDCP PDU will be generated by performing integrity protection and ciphering with the key information from the second cell when the PDCP entity is re-established. For UM DRBs, the PDCP SDU, which has already been submitted to the lower layers but has not been transmitted yet, will be discarded due to the associated discardTimer expiry or the failed deciphering caused by the key information change. To avoid data loss, how to handle the non-SDT PDCP PDUs generated in the case of the UE being in the non-connected state, e.g., during a SDT procedure should be optimized.

In addition, other issues on data transmission associated with the terminal device in the non-connected state should also be solved. For example, the new key information derived from a new cell during the movement of the UE is not always enabled (or applied). In some scenarios, e.g., for some UM data (UMD) PDCP SDUs, the new key information may be disabled while the old key information is still available. It should be informed to the network side whether the new key information is enabled or whether the old key information is disabled.

Figure 2:
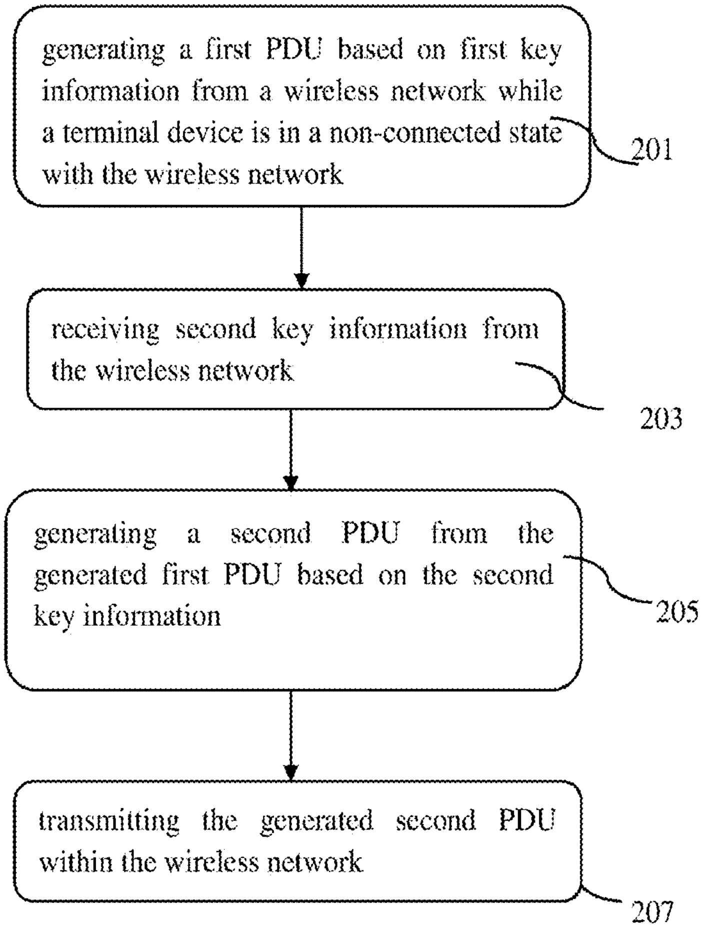
FIG. 2 illustrates a flow chart of a method for data transmission according to some embodiments of the present application.

FIG. 2 is a flow chart illustrating a method for data transmission according to some embodiments of the present application. The exemplary method may be implemented by terminal device or the like. In some embodiments of the present application, the exemplary method may be implemented by the PDCP entity, e.g., the transmitting PDCP entity of a UE or the like.

Referring to FIG. 2, in step 201, the method may include: generating a first PDU based on first key information from a wireless network while a terminal device is in a non-connected state with the wireless network. Due to the movement of the terminal device, e.g., moving to a new cell, second key information may be received from the wireless network in step 203. A second PDU will be generated from the generated first PDU based on the second key information in step 205. For example, generating a second PDU from the generated first PDU is performed to at least one data radio bearer (DRB) in response to configuration information received from a network side or predefined in a specification. The generated second PDU will be transmitted within the wireless network in step 207, e.g., submitting the lower layer.

More details on the embodiments of the present application will be illustrated below.

According to some embodiments of the present application, although a UE is in a non-connected state, e.g., RRC_INCONNECTED state, data may arrive, e.g., arrive at the PDCP layer of the UE from upper layers. Herein (through the specification), the non-connected state may be an active mode, e.g., RRC_INACTIVE state or an idle state, e.g., RRC_IDLE state. Meanwhile, herein (through the specification), an upper layer (or upper layer) and lower layer are named in view of the PDCP layer, that an upper layer is a layer upper or higher than the PDCP layer, e.g., a SDAP layer and a lower layer is a lower than the PDCP layer, e.g., a RLC layer or a MAC layer. The data arrived at the PDCP layer from the upper layer(s) may also referred to as PDCP SDU(s), and may be SDT data or non-SDT data. In some embodiments of the present application, the arrived data may be any mode DRB including transparent mode (TM) DRB, UM DRB and acknowledged mode (AM) DRB etc. In some other embodiments of the present application, the arrived data may be for one or more specific DRBs, e.g., only for UM non-SDT DRBs, or a part of the UM non-SDT DRBs.

At reception of a PDCP SDU from upper layers, the transmitting PDCP entity will start the discardTimer associated with this PDCP SDU (if configured). For the PDCP SDU received from the upper layer(s), the PDCP entity will associate it with a PDCP SN to generate a PDCP PDU with currently enabled key information, e.g., first key information derived from a first cell. The key information may include $K_{gNB}$ and $K_{RRCint}$ keys as specified in current 3GPP specifications. The generated PDCP PDU will be submitted to the lower layer(s). However, since the UE is mobile, the key information may change. For example, the first key information may be disabled due to applying second key information provided by a second cell when the UE in non-connected state moves into the second cell.

In the case the second key information is enabled or applied, in the PDCP layer, at least one second PDCP PDU with the second key information will be generated based on at least one PDCP SDU, wherein the at least one PDCP SDU is associated with at least one first PDCP PDU generated with the first key information (hereafter, referred to as "PDU re-generation"). That is, for a PDCP PDU generated with the first key information, its associated PDCP PDU may be re-generated with the second key information to avoid data loss. The PDU regeneration may be a kind of generation based on the same SDU, while the key information for generation and that for regeneration is different.

According to some embodiments of the present application, the PDU re-generation is applied to at least one DRB in response to configuration information received from a network side or predefined in a specification. For example, in the case that the terminal device not be resumed to a connected state, all non-SDT DRBs may not be resumed, or a part of non-SDT DRBs may be resumed, e.g., UM DRBs, or all non-SDT DRBs may be resumed. The configuration information may configure to apply the PDU re-generation only to the resumed non-SDT DRB.

In addition, the PDU re-generation can be defined in various schemes (or manners).

For example, according to some embodiments of the present application, the PDU regeneration begins from a PDCP SDU first being submitted to the layer lower than the PDCP layer, i.e., from the first PDCP SDU submitted to the lower layer. In this case, the PDU regeneration can be applied to all DRBs or only to least one configured or pre-defined DRB, e.g., UM resumed non-SDT DRB.

According to some other embodiments of the present application, the PDU regeneration is applied to PDCP SDU(s) whose corresponding RLC SDU or RLC SDU segment has not been delivered to a MAC layer in the case the non-connected state being transferred to the connected state (that is, the UE is sent to the connected state). In this case, the PDU regeneration can be applied to all DRBs or only to least one configured or pre-defined DRB, e.g., UM non-SDT DRB or resumed non-SDT DRB etc.

According to some yet other embodiments of the present application, the PDU regeneration is performed in response to the UE receiving the second key information. In this case, the PDU regeneration can be applied to all DRBs or only to least one configured or pre-defined DRB, e.g., UM non-SDT DRB or resumed non-SDT DRB etc.

According to some yet other embodiments of the present application, the PDU regeneration is performed in the case that a higher layer, i.e., a layer higher than the PDCP layer requests a PDCP entity re-establishment. In this case, the PDU regeneration can also be applied to all DRBs or only to least one configured or pre-defined DRB, e.g., UM non-SDT DRB or resumed non-SDT DRB etc.

According to some yet other embodiments of the present application, the PDU regeneration is applied to PDCP SDU(s) which has been submitted to the layer lower than the PDCP layer. In this case, the PDU regeneration can be applied to all DRBs or only to least one configured or pre-defined DRB, e.g., UM non-SDT DRB or resumed non-SDT DRB etc.

According to some yet other embodiments of the present application, the PDU regeneration is applied to PDCP SDU(s), for which included in MAC PDU(s) or for whose corresponding RLC SDU(s) or RLC SDU segment included in the MAC PDU(s), successful delivery(s) has not been confirmed in the case the non-connected state being transferred to a connected state. In other words, in the case that successful delivery(s) for PDCP SDU(s) included in MAC PDU(s) has not been confirmed in the case the non-connected state being transferred to a connected state, the PDU regeneration will be applied to the corresponding PDCP SDU(s); or in the case that successful delivery(s) for the corresponding RLC SDU(s) or RLC SDU segment included in the MAC PDU(s) of PDCP SDU(s) has not been confirmed in the case the non-connected state being transferred to a connected state, the PDU regeneration will be applied to the corresponding PDCP SDU(s). Similarly, in this case, the PDU regeneration can be applied to all DRBs or only to least one configured or pre-defined DRB, e.g., UM non-SDT DRB or resumed non-SDT DRB etc.

In some embodiments of the present application, the delivery state of the first PDCP PDU generated with the first key information will not be considered when determining the PDCP PDU re-generation. For example, regardless the delivery state, e.g., whether being successfully delivered to the network side or just to a lower layer, the PDU regeneration is just applied to at least one configured or pre-defined DRB, e.g., UM non-SDT DRB or resumed non-SDT DRB etc. That is, all PDCP PDUs generated with the old key information, e.g., the first key information for the at least one configured or pre-defined DRB will be re-generated. In some other embodiments of the present application, regardless the delivery state, the PDU regeneration is just applied up to UE implementation.

For any DRB, e.g., AM DRB or UM DRB etc., an exemplary specific operation on the PDU re-generation according to some embodiments of the present application is illustrated below. In the case that the non-connected state is transferred to a connected state, or the UE receives the new key information, e.g., the applied second information, or a higher layer requests a PDCP entity re-establishment; the transmitting PDCP entity or the like may: not re-establish a PDCP entity for at least one of SDT DRB and SDT DRB, or not discard PDCP SDU(s) corresponding to the first PDCP PDU(s) generated with the first key information. The transmitting PDCP entity or the like may indicate the lower layer to discard the particular RLC SDU and the corresponding RLC PDU, wherein the particular RLC SDU is associated with the PDCP SDU based on which the PDCP PDU will re-generated. For the PDCP PDU to be re-generated with the new key information, the transmitting PDCP entity or the like may: associate the COUNT value corresponding to TX_NEXT with this PDCP SDU; perform header compression of the PDCP SDU using at least one of ROHC and EHC; perform integrity protection and ciphering using the TX_NEXT, respectively; set the PDCP SN of the PDCP Data PDU to TX_NEXT modulo $2^{[pdcp\text{-}SN\text{-}SizeUL]}$; and increment TX_NEXT by one. Then, the transmitting PDCP entity will submit the generated PDCP PDU with the new key information to the lower layer, e.g., the RLC layer. Herein, all the above mentioned parameters, e.g., COUNT, TX_NEXT etc. are specified in the 3GPP specification, e.g., TS 38. 323, and thus will not repeat.

More specific operation for different particular DRBs may be a little bit different based on the above basic solution. For example, for UM DRB, according to some embodiments of the present application, for each PDCP SDU already associated with a PDCP SN and for which a corresponding PDU has been submitted to the lower layer(s), the transmitting PDCP entity will include at least one of the following steps: regarding (or considering) the PDCP SDU as received from upper layer; and performing transmission of the PDCP SDU in an ascending order of the COUNT value associated with the PDCP SDU, which is prior to the PDCP entity re-establishment without restarting the discardTimer in the case of PDCP entity re-establishment. Similarly, for a PDCP SDU, the transmitting PDCP entity will associate the COUNT value corresponding to TX_NEXT with this PDCP SDU; perform header compression of the PDCP SDU using at least one ROHC and EHC; perform integrity protection and ciphering using the TX_NEXT, respectively; set the PDCP SN of the PDCP Data PDU to TX_NEXT modulo $2^{[pdcp\text{-}SN\text{-}SizeUL]}$; and increment TX_NEXT by one. Then, the transmitting PDCP entity will submit the generated PDCP PDU with the new key information to the lower layer, e.g., the RLC layer.

As stated above, in some embodiments of the present application, only one or more particular DBRs, e.g., only UM DRB are configured to be transmitted in the non-connected state according to the configuration information received from the network side or predefined in a specification. Accordingly, in response to the old key information being replaced by the new key information, the transmitting PDCP entity or the like may suspend the ciphering and integrity protection for the PDCP PDU for the DRB, e.g., AM DRB, which is not configured to be transmitted in the non-connected state. For example, suspending the ciphering and integrity protection for the DRB may include temporarily stopping performing the ciphering and integrity protection with any key information. In the case that the terminal device transfers from the non-connected state to the connected state, in some embodiments of the present application, the suspended ciphering and integrity protection will be resumed, e.g., performing the ciphering and integrity protection with the second key information for PDCP PDU(s).

Considering that the new key information, e.g., the second key information received during the UE movement may not be enabled, whether the new key information is enabled will be indicated to the network side. According to some embodiments of the present application, an indication for indicating whether the second key information is enabled or whether the first key information is disabled will be transmitted to the network side. For example, the indication may be included in the first PDCP PDU generated with the new key information, e.g., the applied second key information.

Specifically, in the case that the new key information received by the UE, e.g., the second key information is applied or enabled, for at least one of non-SDT DRB and SDT DRB for which a corresponding PDCP PDU has been submitted to lower layer(s), the transmitting PDCP entity of the UE may apply the new key information to the corresponding PDCP SDU and the following PDCP SDUs. In some embodiments of the present application, the non-SDT DRB may be UM non-SDT DRB. The following PDCP SDUs may be PDCP PDUs re-generated with the new key information. The transmitting PDCP entity may include an indication in these PDCP PDUs to indicate that the new key information is enabled, or only include the indication in the first PDCP PDU, or indicate the indication in other manners. In some embodiments of the present application, the old key information may be transmitted to the network side to indicate that the old key information is not disabled. In the case that the second key information is enabled or the old key information is disabled, the transmitting PDCP entity will discard the old key information.

According to some embodiments of the present application, the indication will be transmitted via a bit, e.g., a reversed bit in a 'R' field in the existing PDCP data PDU format.

Figure 3:
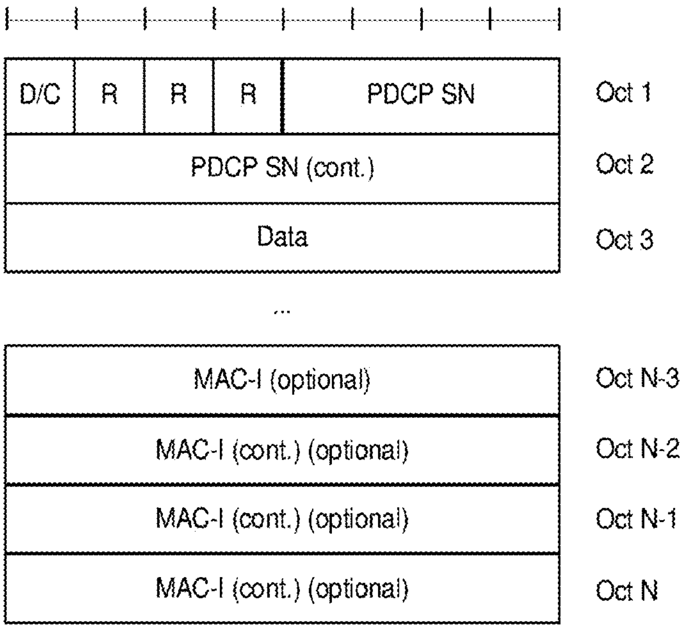
FIG. 3 illustrates the format of the PDCP data PDU with 12-bit PDCP SN specified in 6.2.2.2, TS 38.323.

For example, FIG. 3 illustrates the format of the PDCP data PDU with 12 bits PDCP SN specified in 6.2.2.2, TS 38.323, which is applicable for UM DRBs and AM DRBs. The bit for indicating whether the new key information is enabled or the old key information is disabled can be any reserved bit in the "R" field of the PDCP data PDU, e.g., the leftmost bit or rightmost bit of the first 'R' field or other 'R' fields. Besides the format of the PDCP data PDU shown in FIG. 3, other PDCP PDU formats can also be used to include the bit for indicating whether the new key information is enabled or the old key information is disabled.

According to some embodiments of the present application, the indication will be transmitted via a message to the network side. For example, a PDCP SN can be included in the message to indicate from which SDU the new key information is enabled or the old key is disabled.

Embodiments of the present application also propose a technical solution about novel BFR for non-SDT trigger conditions. The term "BSR" is usually used to indicate the buffer status for a logical channel group (LCG), and the BSR is triggered to report the buffer size per LCG. According to embodiments of the present application, the BSR including at least one of a BSR for non-SDT and a BSR for SDT is introduced to a data transmission associated with a terminal device in the non-connected state. How to define the BSR triggering procedure based on logical channel needs to be considered and will be illustrated in the following description of the present application.

According to some embodiments of the present application, when a UE is in the non-connected state, a SDT procedure may be initialized while non-SDT data may arrive from upper layer(s). The non-SDT DRB or its corresponding logical channel is configured to allow that its buffer state can be reported or not in the case of the UE being in the non-connected state. For example, whether to report the buffer state of non-SDT is allowed or not is configured per RLC entity mode, e.g., per TM, per UM or per AM. For example, the above configuration is per AM, and the non-SDT DRB or its corresponding logical channel may be configured as that only the buffer state of the data corresponding to an AM RLC entity can be reported. In response to at least one BSR trigger condition being satisfied, the buffer state of a logical channel associated with the arrived non-SDT data during the SDT procedure will be reported. The BSR for the non-SDT data may be multiplexed in the SDT. For example, a BSR trigger condition is whether a time point to an expiry of non-SDT SDU discardTimer is larger than a threshold. In the case that a BSR for non-SDT is triggered while the UE fails to receive a response message to the initial transmission, the SDT procedure will be stopped. A random access procedure, e.g., a 4-step RACH or 2-step RACH resuming a RRC connection will be triggered.

In addition, embodiments of the present application also propose an apparatus for data transmission. For example, FIG. 4 illustrates a block diagram of an apparatus 400 for data transmission according to some embodiments of the present application.

Figure 4:
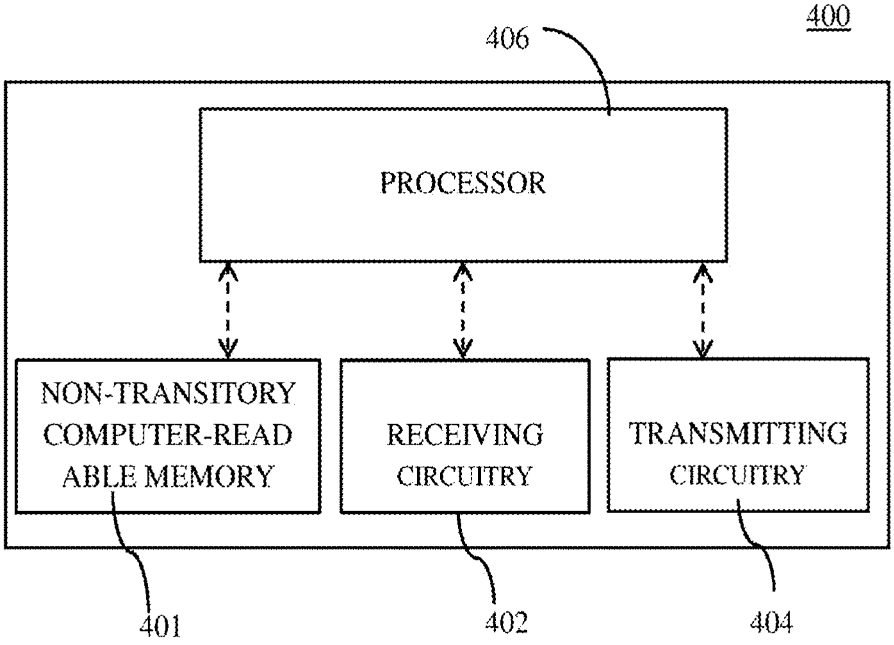
FIG. 4 illustrates an apparatus according to some other embodiments of the present application.

As shown in FIG. 4, the apparatus 400 may include at least one non-transitory computer-readable medium 401, at least one receiving circuitry 402, at least one transmitting circuitry 404, and at least one processor 406 coupled to the non-transitory computer-readable medium 401, the receiving circuitry 402 and the transmitting circuitry 404. The apparatus 400 may be a terminal device (e.g., a UE, or a transmitting PDCP entity of a UE) configured to perform a method illustrated in FIG. 2 or the like.

Although in this figure, elements such as the at least one processor 406, transmitting circuitry 404, and receiving circuitry 402 are described in the singular, the plural is contemplated unless a limitation to the singular is explicitly stated. In some embodiments of the present application, the receiving circuitry 402 and the transmitting circuitry 404 can be combined into a single device, such as a transceiver. In certain embodiments of the present application, the apparatus 400 may further include an input device, a memory, and/or other components.

For example, in some embodiments of the present application, the non-transitory computer-readable medium 401 may have stored thereon computer-executable instructions to cause a processor to implement the method with respect to the terminal device as described above. For example, the computer-executable instructions, when executed, cause the processor 406 interacting with receiving circuitry 402 and transmitting circuitry 404, so as to perform the steps with respect to the terminal device depicted in FIG. 2.

In some embodiments of the present application, the non-transitory computer-readable medium 401 may have stored thereon computer-executable instructions to cause a processor to implement the method with respect to the BS as described above. For example, the computer-executable instructions, when executed, cause the processor 406 interacting with receiving circuitry 402 and transmitting circuitry 404, so as to perform the steps with respect to the transmitting PDCP entity illustrated above.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus including a processor and a memory. Computer programmable instructions for implementing a method stored in the memory, and the processor is configured to perform the computer programmable instructions to implement the method. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method as stated above or other method according to an embodiment of the present application.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

What is claimed:

1. A user equipment (UE) for wireless communication, comprising:

at least one memory; and at least one processor coupled with the at least one memory and operable to cause the UE to:

initialize a small data transmission (SDT) procedure when the UE is in a non-connected state;

detect, during the SDT procedure, a trigger condition associated with a buffer status report (BSR) comprising a buffer state of a logical channel;

determine to report the buffer state in the BSR based at least in part on a radio link control (RLC) entity mode of an RLC entity associated with the logical channel, wherein whether to report the buffer state in the BSR is configured per RLC entity mode of a plurality of RLC entity modes, and wherein the plurality of RLC entity modes comprises a transparent mode (TM), an acknowledged mode (AM), or an unacknowledged mode (UM); and transmit, based at least in part on the trigger condition and in response to the determining, the BSR comprising the buffer state, wherein the BSR is multiplexed in an SDT associated with the SDT procedure, and wherein a buffer size associated with the BSR is based at least in part on the RLC entity mode comprising the TM, the AM, or the UM.

2. The UE of claim 1, wherein the buffer state is associated with one or more data radio bearers (DRBs) configured for the SDT.

3. The UE of claim 2, wherein the one or more DRBs configured for the SDT belong to one or more logical channel groups (LCGs) comprising the logical channel.

4. The UE of claim 3, wherein the BSR for the SDT of the one or more DRBs is triggered to report the buffer size per LCG.

5. The UE of claim 1, wherein the at least one processor is further operable to cause the UE to trigger a random access channel (RACH) procedure to resume a radio resource control (RRC) connection.

6. The UE of claim 5, wherein the RRC connection is resumed for buffered data.

7. The UE of claim 1, wherein the SDT procedure is initialized based at least in part on obtaining non-SDT data, and wherein the logical channel is associated with the non-SDT data.

8. The UE of claim 1, wherein the trigger condition is based at least in part on a time of expiry of a non-SDT service data unit (SDU) discard timer being larger than a time threshold.

9. The UE of claim 1, wherein the at least one processor is further operable to cause the UE to stop the SDT procedure based at least in part on the BSR being triggered prior to receiving a response message to an initial transmission, wherein the BSR is associated with non-SDT data.

10. A method performed by a user equipment (UE), the method comprising:

initializing a small data transmission (SDT) procedure when the UE is in a non-connected state;

detecting, during the SDT procedure, a trigger condition associated with a buffer status report (BSR) comprising a buffer state of a logical channel;

determining to report the buffer state in the BSR based at least in part on a radio link control (RLC) entity mode of an RLC entity associated with the logical channel, wherein whether to report the buffer state in the BSR is configured per RLC entity mode of a plurality of RLC entity modes, and wherein the plurality of RLC entity modes comprises a transparent mode (TM), an acknowledged mode (AM), or an unacknowledged mode (UM); and transmitting, based at least in part on the trigger condition and in response to the determining, the BSR comprising the buffer state, wherein the BSR is multiplexed in an SDT associated with the SDT procedure, and wherein a buffer size associated with the BSR is based at least in part on the RLC entity mode comprising the TM, the AM, or the UM.

11. The method of claim 10, wherein the buffer state is associated with one or more data radio bearers (DRBs) configured for the SDT.

12. The method of claim 11, wherein the one or more DRBs configured for the SDT belong to one or more logical channel groups (LCGs) comprising the logical channel.

13. The method of claim 10, further comprising triggering a random access channel (RACH) procedure to resume a radio resource control (RRC) connection.

14. The method of claim 10, wherein the SDT procedure is initialized based at least in part on obtaining non-SDT data, and wherein the logical channel is associated with the non-SDT data.

15. The method of claim 10, wherein the trigger condition is based at least in part on a time of expiry of a non-SDT service data unit (SDU) discard timer being larger than a time threshold.

16. The method of claim 10, further comprising stopping the SDT procedure based at least in part on the BSR being triggered prior to receiving a response message to an initial transmission, wherein the BSR is associated with non-SDT data.

17. A network equipment (NE) for wireless communication, comprising:

at least one memory; and at least one processor coupled with the at least one memory and operable to cause the NE to:

initialize a small data transmission (SDT) procedure when a user equipment (UE) is in a non-connected state, wherein a trigger condition associated with a buffer status report (BSR) comprising a buffer state of a logical channel is satisfied during the SDT procedure, wherein whether the BSR comprises the buffer state is configured per radio link control (RLC) entity mode of a plurality of RLC entity modes, and wherein the plurality of RLC entity modes comprises a transparent mode (TM), an acknowledged mode (AM), or an unacknowledged mode (UM); and receive, based at least in part on the trigger condition, the BSR comprising the buffer state, wherein the BSR is multiplexed in an SDT associated with the SDT procedure, wherein the buffer state is reported in the BSR based at least in part on an RLC entity mode of an RLC entity associated with the logical channel, and wherein a buffer size associated with the BSR is based at least in part on the RLC entity mode comprising the TM, the AM, or the UM.

18. A method performed by a network equipment (NE), the method comprising:

initializing a small data transmission (SDT) procedure when a user equipment (UE) is in a non-connected state, wherein a trigger condition associated with a buffer status report (BSR) comprising a buffer state of a logical channel is satisfied during the SDT procedure, wherein whether the BSR comprises the buffer state is configured per radio link control (RLC) entity mode of a plurality of RLC entity modes, and wherein the plurality of RLC entity modes comprises a transparent mode (TM), an acknowledged mode (AM), or an unacknowledged mode (UM); and receiving, based at least in part on the trigger condition, the BSR comprising the buffer state, wherein the BSR is multiplexed in an SDT associated with the SDT procedure, wherein the buffer state is reported in the BSR based at least in part on an RLC entity mode of an RLC entity associated with the logical channel, and wherein a buffer size associated with the BSR is based at least in part on the RLC entity mode comprising the TM, the AM, or the UM.

19. The NE of claim 17, wherein the buffer state is associated with one or more data radio bearers (DRBs) configured for the SDT.

20. The NE of claim 19, wherein the one or more DRBs configured for the SDT belong to one or more logical channel groups (LCGs) comprising the logical channel.

* * * * *